Feb. 6, 1934.   J. C. SABEL   1,945,999
FOCUSING LENS MOUNTING
Filed May 18, 1933
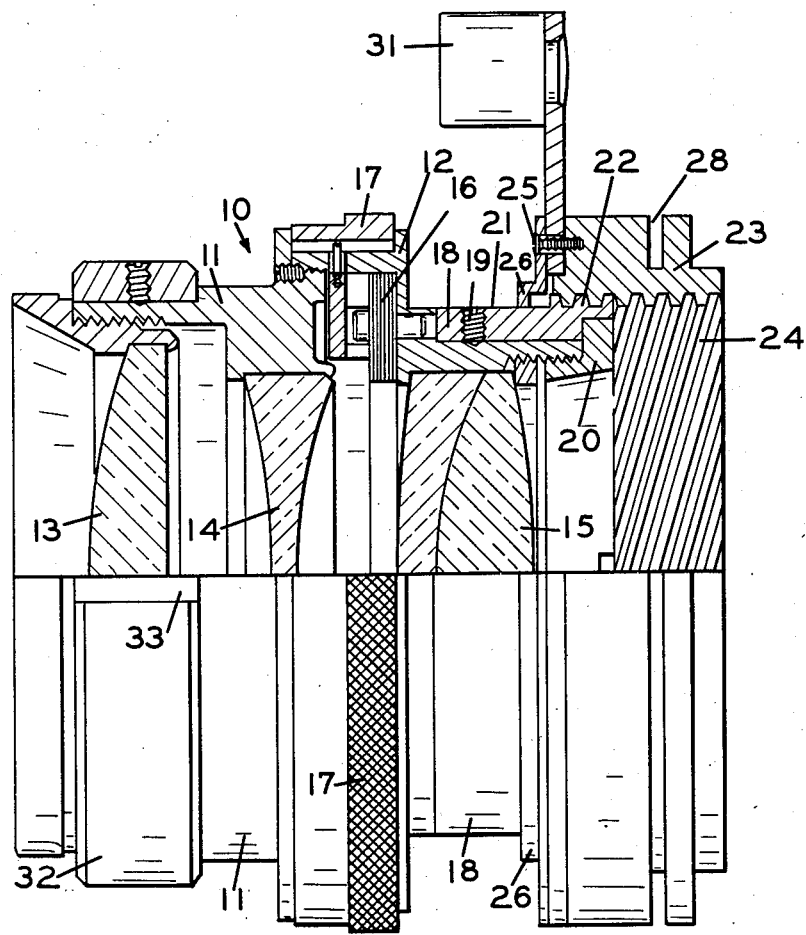
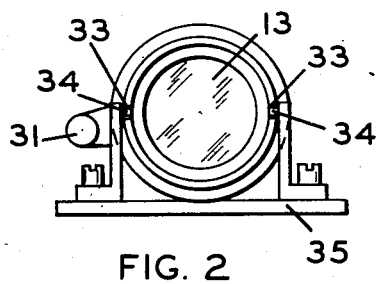
FIG. 2
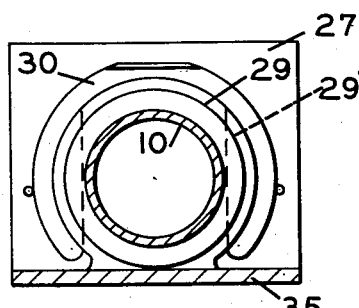
FIG. 3
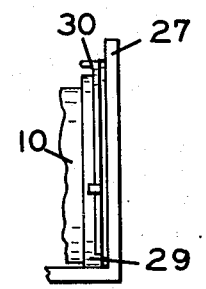
FIG. 4
JOHN C. SABEL
INVENTOR
BY *G. A. Ellestad*
ATTORNEY Patented Feb. 6, 1934

1,945,999

UNITED STATES PATENT OFFICE 1,945,999

FOCUSING LENS MOUNTING

John C. Sabel, Rochester, N. Y., assignor to Bausch & Lomb Optical Company, Rochester, N. Y., a corporation of New York Application May 18, 1933. Serial No. 671,681

5 Claims. (Cl. 95—45)

This invention relates to lens mountings and more particularly it has reference to camera lens mountings of the type in which one or more lens elements may be moved for the purpose of focusing the lens for different object distances.

One of the objects of my invention is to provide an improved focusing mount which will be relatively simple and compact in structure yet efficient in operation. Another object is to provide a focusing mount having a rotatable nut for moving the lens barrel axially and stop means on said nut for limiting the relative movement of said nut and barrel. A further object is to provide a focusing mount having a rotatable nut cooperating with a threaded barrel and means for concealing and protecting the threaded portions. Other objects and advantages reside in certain novel features of construction, arrangement and combination of parts as will hereinafter be more fully described and pointed out in the appended claims.

Referring to the drawing:

Fig. 1 is a view, partly in section, showing a focusing mount embodying my invention.

Figs. 2, 3 and 4 are views showing one method of attaching my mounting to a camera.

A preferred embodiment of my invention is shown on the drawing wherein 10 indicates, generally, a lens barrel comprising the front portion 11 which is threaded to the rear portion 12. The front portion 11 carries the lense elements 13 and 14 while the rear portion carries the lens element 15. Mounted between the lens elements 14 and 15 is the iris diaphragm 16 which can be adjusted by the rotatable knurled ring 17. The structure of the diaphragm is not described in detail since it forms no part of the present invention.

Mounted on the rear portion 12 of barrel 10 is the bushing 18 which is secured thereto by the set screw 19 and the threaded ring 20. The bushing 18 has a smooth cylindrical surface 21 and an adjacent threaded portion 22 with the threads projecting above the surface. A rotatable nut 23 which is internally threaded as at 24 cooperates with the threaded portion 22 on bushing 18. Secured to a face of nut 23 by screws 25 is a ring 26 having an inwardly projecting flange portion which just clears the smooth surface 21 but which is adapted to contact with the thread portion 22 as the nut and barrel are moved relatively to each other.

One method of attaching my lens mounting to the lens board 27 of a camera is illustrated in Figs. 2-4. In such an arrangement the nut 23 is provided with a circumferential groove 28. The lens board is provided with a projecting flange 29 having slots 29' formed on opposite sides. The lens mount is placed against the lens board so that the groove 28 is in register with slots 29'. A flat locking blade 30 of inverted U-shape is then slid down through slots 29' and into groove 28 thereby locking the mount firmly in place while still permitting free rotation of the nut 23 by means of the attached handle 31. Mounted on the front of the mount is a collar 32 provided with oppositely disposed grooves 33 into which project the two fingers 34 carried by the camera door 35. It will thus be obvious that rotation of nut 23 will cause the lens barrel to move axially since it is restrained from rotation by the grooves 33 and fingers 34.

From the foregoing it will be obvious that I am able to attain the objects of my invention and provide an improved focusing mount. When the mount is removed from the camera the nut 23 cannot become disengaged from the barrel since the flange on ring 26 acts as a limiting stop. All of the threaded portions are covered and hence are protected against dirt and accidental injury. Various modifications can obviously be made without departing from the spirit of my invention.

I claim:

1. In a focusing mount the combination of a barrel member carrying lenses, said barrel having a threaded portion, a rotatable nut member having an internal threaded portion engaging the threaded portion on said barrel, one of said members having a surface above which its threads extend, the other member having a stop adapted to contact with said threads to limit the relative movement of said members.

2. A focusing mount comprising a barrel carrying lenses, said barrel having a threaded portion, a rotatable nut having threads cooperating with said threaded portion, means for holding said barrel against rotation whereby rotation of said nut will move said barrel axially, and stop means on said nut for limiting the axial movement of said barrel in both directions.

3. A focusing mount comprising a barrel carrying lens elements, a bushing secured to said barrel, said bushing having a threaded shoulder portion, a rotatable nut having an internal threaded portion cooperating with the threaded shoulder portion, an inwardly projecting flange mounted on said nut, said flange being adapted to contact with said shoulder portion for limiting the relative movement of said nut and barrel.

4. In a focusing mount the combination of a lens barrel having a threaded portion and a smooth portion of reduced diameter, a rotatably mounted nut which is internally threaded to cooperate with said threaded portion, and a flange on said nut, said flange projecting inwardly so as to clear said smooth portion but engage said threaded portion to limit the relative movement of said nut and barrel.

5. A focusing mount comprising a barrel carrying lens elements, said barrel having a smooth cylindrical portion and an adjacent threaded portion projecting beyond the smooth portion, a rotatable nut having an internal threaded portion cooperating with the threaded portion on the barrel, said nut having a stop member adapted to contact with the threaded portion on the barrel to limit the relative movement of said nut and barrel.

JOHN C. SABEL.